(12) United States Patent
Gill et al.

(10) Patent No.: US 12,330,331 B2
(45) Date of Patent: Jun. 17, 2025

(54) PORTIONER MIST MANAGEMENT ASSEMBLY

(71) Applicant: JBT Marel Corporation, Chicago, IL (US)

(72) Inventors: Harrison T. Gill, Redmond, WA (US); Erick A. Sorenson, Shoreline, WA (US)

(73) Assignee: JBT Marel Corporation, Chicago, IL (US)

( * ) Notice: Subject to any disclaimer, the term of this patent is extended or adjusted under 35 U.S.C. 154(b) by 0 days.

(21) Appl. No.: 18/655,635

(22) Filed: May 6, 2024

(65) Prior Publication Data

US 2024/0286308 A1     Aug. 29, 2024

Related U.S. Application Data

(60) Division of application No. 18/316,116, filed on May 11, 2023, now Pat. No. 12,017,377, which is a
(Continued)

(51) Int. Cl.
    *B26F 3/00*          (2006.01)
    *A22C 17/00*      (2006.01)
    (Continued)

(52) U.S. Cl.
    CPC .......... *B26F 3/004* (2013.01); *A22C 17/0006* (2013.01); *A22C 21/003* (2013.01); *A22C 25/18* (2013.01); *B26D 2210/02* (2013.01)

(58) Field of Classification Search
    CPC ... A22C 25/18; A22C 21/003; A22C 17/0006; B26F 3/004; B26D 2210/02; Y02P 70/10
(Continued)

(56) References Cited

U.S. PATENT DOCUMENTS 2,663,156 A     12/1953   Baker
3,270,464 A *   9/1966   Bowling, Jr. ............. B24C 3/20
                                              451/87
(Continued)

FOREIGN PATENT DOCUMENTS

EP         0223372 A1    5/1987
EP         0244966 B1    11/1987
(Continued)

OTHER PUBLICATIONS

International Search Report and Written Opinion mailed Mar. 6, 2019, issued in corresponding International Application No. PCT/US2018/062537, filed Nov. 27, 2018, 15 pages.
(Continued)

*Primary Examiner* — Ghassem Alie
(74) *Attorney, Agent, or Firm* — Christensen O'Connor Johnson Kindness PLLC

(57) ABSTRACT

Mist management systems are configured for a processing machine having a portioning station configured to portion a workpiece within an enclosed portioner housing having a first side wall extending along the portioning station, a second side wall, at least one hood portion between the first and second side walls, and at least one end wall between the first and second side walls, using at least one liquid jet cutter and a conveyor configured to move the workpiece in a longitudinal direction beneath the at least one liquid jet cutter. The systems may include a tray secured within the enclosed portioner housing beneath the at least one liquid jet cutter and the conveyor, the tray being downwardly angled and configured to direct a waterjet of the liquid jet cutter toward a low pressure plenum chamber positioned external to the first side wall of the enclosed portioner housing.

6 Claims, 9 Drawing Sheets

Related U.S. Application Data division of application No. 16/931,282, filed on Jul. 16, 2020, now Pat. No. 11,685,073, which is a continuation of application No. 15/824,963, filed on Nov. 28, 2017, now Pat. No. 10,751,902.

(51) Int. Cl.
*A22C 21/00* (2006.01)
*A22C 25/18* (2006.01)

(58) Field of Classification Search
USPC ............ 83/22; 451/40, 426, 38, 81, 97
See application file for complete search history.

(56) References Cited

U.S. PATENT DOCUMENTS

| | | | |
|---|---|---|---|
| 3,559,343 A | 2/1971 | Foster | |
| 3,877,334 A | 4/1975 | Gerber | |
| 4,246,838 A | 1/1981 | Pulver et al. | |
| 4,686,877 A | 8/1987 | Jaritz et al. | |
| 4,693,153 A | 9/1987 | Wainwright et al. | |
| 4,731,908 A | 3/1988 | Thorsen | |
| 4,738,056 A * | 4/1988 | Suzuki | B24C 3/10 451/84 |
| 4,875,254 A | 10/1989 | Rudy et al. | |
| 4,966,072 A | 10/1990 | Ellis-Brown | |
| 5,045,021 A | 9/1991 | Borup | |
| 5,295,333 A | 3/1994 | Puschner | |
| 5,323,561 A * | 6/1994 | Yoshikawa | B24C 3/18 451/87 |
| 5,460,564 A | 10/1995 | Bowes et al. | |
| 5,525,782 A | 6/1996 | Yoneno et al. | |
| 5,643,477 A | 7/1997 | Gullo et al. | |
| 5,713,970 A | 2/1998 | Raring | |
| 5,791,970 A * | 8/1998 | Yueh | B24B 57/02 451/60 |
| 5,802,959 A | 9/1998 | Benson et al. | |
| 5,831,224 A | 11/1998 | Wattles et al. | |
| 6,098,512 A | 8/2000 | Life et al. | |
| 6,222,155 B1 | 4/2001 | Blackmom et al. | |
| 6,224,463 B1 | 5/2001 | Hartzell, Jr. | |
| 6,233,841 B1 | 5/2001 | Beach | |
| 6,280,302 B1 | 8/2001 | Hashish et al. | |
| 6,358,120 B1 | 3/2002 | Poling et al. | |
| 6,826,989 B1 | 12/2004 | Wattles et al. | |
| 7,121,918 B2 | 10/2006 | Marti et al. | |
| 7,445,806 B2 | 11/2008 | Shah et al. | |
| 8,827,770 B2 | 9/2014 | Kuhlman | |
| 8,920,210 B2 | 12/2014 | Benson | |
| 9,044,705 B2 | 6/2015 | Tada et al. | |
| 10,213,899 B2 | 2/2019 | Mangrich et al. | |
| 10,332,759 B2 | 6/2019 | Takano | |
| 2004/0092216 A1 | 5/2004 | Publ et al. | |
| 2008/0276777 A1 | 11/2008 | Blaine et al. | |
| 2009/0013839 A1 | 1/2009 | Kanai et al. | |
| 2009/0038455 A1 | 2/2009 | Strong et al. | |
| 2009/0250140 A1 | 10/2009 | Vetsch | |
| 2011/0293797 A1 | 12/2011 | Pryor et al. | |
| 2015/0150270 A1 | 6/2015 | Barnett et al. | |
| 2016/0089701 A1 | 3/2016 | Kosuda et al. | |

FOREIGN PATENT DOCUMENTS

| | | |
|---|---|---|
| EP | 3072650 A2 | 9/2016 |
| JP | 6-335839 A | 12/1994 |
| JP | 2002-239323 A | 8/2002 |

OTHER PUBLICATIONS

Chinese Office Action mailed on Mar. 30, 2021 for corresponding Chinese Application No. 201880076791.2, filed on Nov. 27, 2018, and its English translation thereof, 10 pages.

\* cited by examiner

PORTIONER MIST MANAGEMENT ASSEMBLY

CROSS-REFERENCES TO RELATED APPLICATIONS

This application is a division of U.S. patent application Ser. No. 18/316,116, filed May 11, 2023, which is a division of U.S. patent application Ser. No. 16/931,282, filed Jul. 16, 2020 (now U.S. Pat. No. 11,685,073), which is a continuation of U.S. patent application Ser. No. 15/824,963 (now U.S. Pat. No. 10,751,902), filed Nov. 28, 2017, the disclosures of all of which are expressly incorporated herein by reference in their entirety.

BACKGROUND

Waterjet portioner machines are commonly used in the food industry for cutting products, such as chicken, beef, pork, or fish. A high pressure stream of water can easily cut through meat products, without abrasives, at pressures from about 30,000 psi to over 80,000 psi. The jet of water (the "waterjet") leaving the waterjet nozzle may be moving at about 4000 ft/second, or mach 3.5.

The waterjet streams are generated by pumping the water at the high pressure through a very fine diamond or ruby nozzle with an orifice diameter generally ranging from 0.004" inches to 0.01 inches. Any remaining liquid portion of the water jet must be drained from the machine. However, not all the liquid remains as part of the water jet.

Rather, as the high pressure water jet stream leaves the orifice, it is generally coherent for a few inches, but it then begins to "break up" as the stream travels further from the orifice. As a result, mist is formed coming off the water jet stream, accompanied by sound waves. Moreover, when a water jet stream strikes a hard surface, it will break up completely into mist and droplets, wherein the droplets may be deflected at different angles into the interior of the machine depending on the angle of the hard surface they impact.

The mist in a waterjet portioner is unusual in that it can be a mixture of air, steam, and very fine droplets. The dynamics of this mix are very complex. The water under high pressure can be heated to high temperatures, such as one hundred and fifty degrees Fahrenheit to one hundred and eighty degrees Fahrenheit (150° F.-180° F.). Some of the heat can then be consumed in the rapid evaporation of water from enormous surface area of the droplets. The simultaneous mass and heat transfer of a non-standard fluid in rapid motion presents a difficult air handling problem for the evacuation and control of the mists. For instance, the mist from the water jet expands into a very large volume when it is generated, into an area of the machine that is generally enclosed for safety reasons. This large volume of mist that is continuously generated must be continuously evacuated from the enclosed area of the machines for a number of reasons.

One reason for continuous mist evacuation is that the mist would otherwise interfere with any vision/scanning system of the machine. In a water jet portioner machine, product is typically first carried past a vision/scanning system (which may have a light source(s) and a camera(s)), and then into the enclosed portioner housing where typically up to eight water jet cutters cut the product. Mist can migrate to areas where the vision system operates, interfering with the vision system's view of the product by either simply obscuring the view (i.e., the product cannot be seen by the camera(s) through the cloud of mist), or by condensing on the windows that protect the camera(s) and light source(s).

Another reason for continuous mist evacuation is that the visibility of the operators looking inside the cut housing can be severely limited by the mist. This makes troubleshooting of issues during production by operators and service personnel more difficult.

Additionally, mist can condense on the surfaces of the portioner housing above the product being conveyed, and drip onto the product, leading to hygiene concerns.

In seafood and poultry processing, it is not uncommon for the product to be in contact with water. For red meats and other products, there is much more emphases on keeping product dry. Water on red meat surfaces will promote browning of the meat surface due to oxidation. Additionally, there may be more strict regulations on labeling of water that is picked up by red meat than with poultry or seafood. Therefore, another reason for mist reduction and control is that it is especially important and beneficial for red meat processing.

Based on at least the foregoing, it can be appreciated that a mist management system and method thereof for a waterjet portioner or the like is desired. Such a mist management system and method may improve visibility into the machine, reduce condensation, minimize interference with the scanning system, and improve hygiene and processing efficiency, while remaining easy to clean, inspect and sanitize.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A mist management system for a processing machine includes a pressure distribution assembly configured to evacuate mist from a portion of the processing machine into a plenum using pressure differences between the portion of the processing machine and the plenum. In one aspect, the system further includes a mist directing assembly configured to purposefully direct mist toward the plenum using movement and momentum of the mist.

A mist management system for a processing machine includes a portioning station configured to portion a workpiece with at least one liquid jet cutter and a conveyor for moving the workpiece beneath the portioning station. The mist management system includes a pressure distribution assembly configured to evacuate mist from the portioning station into a plenum using pressure differences between the portioning station and the plenum. In one aspect, the system further includes a mist directing assembly configured to purposefully direct mist within the portioning station toward the plenum using movement and momentum of the mist.

A method of managing mist within a processing machine includes conveying a workpiece to a portioning station, activating at least one liquid jet cutter, creating a low pressure chamber in pneumatic communication with the portioning station through at least one orifice, and directing air toward the low pressure chamber.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
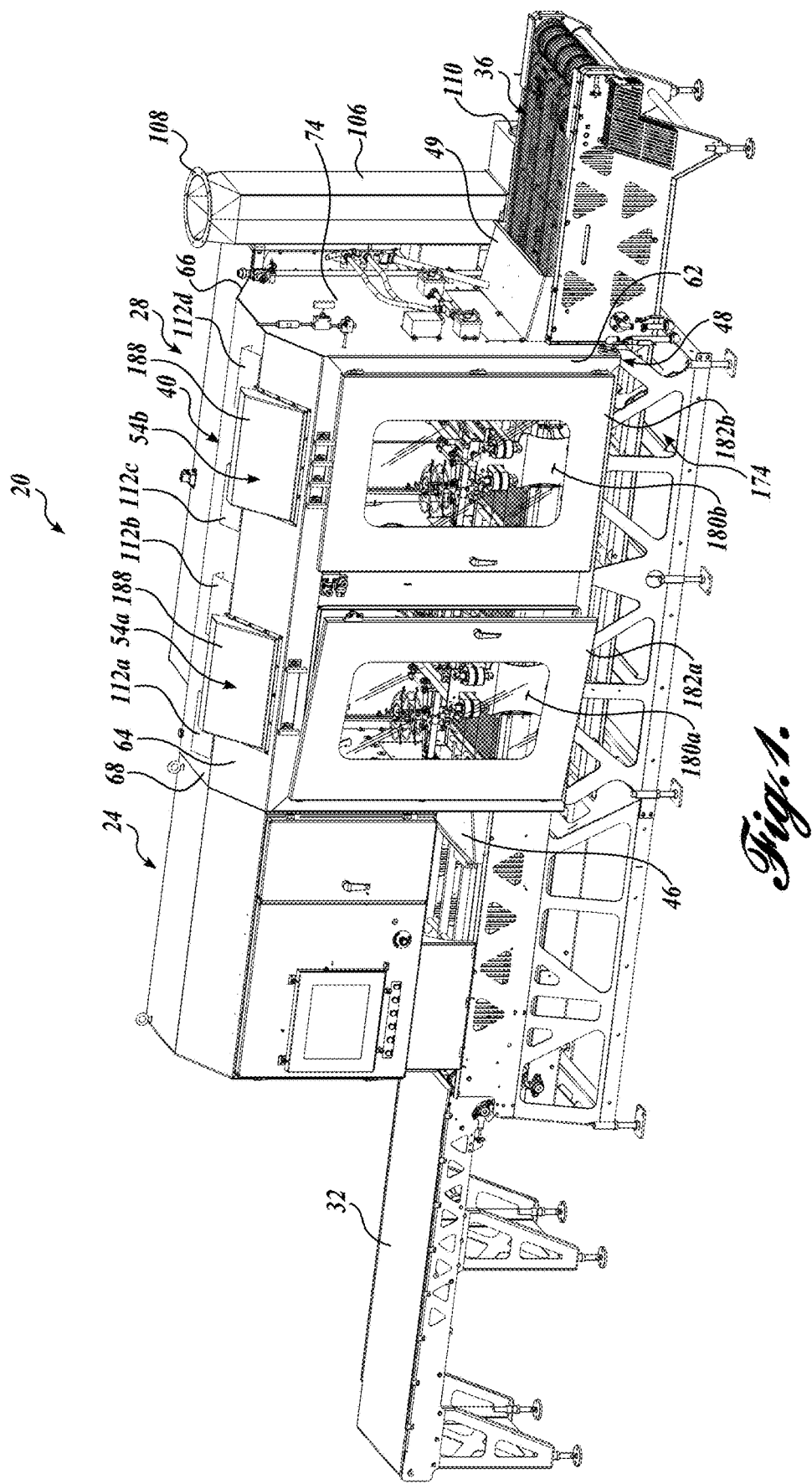
FIG. 1 is a front isometric view of a processing machine having a mist management system formed in accordance with an exemplary embodiment of the present disclosure.

The description set forth below in connection with the appended drawings, where like numerals reference like elements, is intended as a description of various embodiments of a mist management system and method and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "in," "out," "extended," "advanced," "retracted," "proximal," "distal," etc. These references and other similar references in the present application are only to assist in helping describe and understand the present disclosure and are not intended to limit the present invention to these directions.

The present application may also include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally rectangular in shape," the shape need not be exactly rectangular as long as the required function of the structure in question can be carried out.

Moreover, the present disclosure describes a "mist" management system. Any reference to "mist" should be interpreted to include at least one of mist, droplets, drainage fluid, gas (such as air), steam, etc., and any combination thereof. Moreover, the fluid that makes up the mist may include water, liquid nitrogen, or any other suitable liquid or fluid.

Further, the system and method disclosed in the present application and defined in the present claims, though specifically applicable to workpieces or food items, may also be used outside of the food area. The workpiece may be a food product, such as meat, poultry, or fish, or another type of product, such as, for example, fabric, rubber, cardboard, plastic, wood or other types of material. Accordingly, "workpieces" may include non-food items.

A mist management system and method formed in accordance with an exemplary embodiment of the present disclosure is shown incorporated into an exemplary processing machine 20 for scanning and portioning a workpiece (not shown). Referring to FIG. 1, the exemplary processing machine 20 will first be briefly described. The processing machine 20 generally includes a scanning station 24, a portioning station 28, an upstream conveyor belt 32 for carrying the workpiece to the scanning station 24, and a scanning/portioning conveyor belt 36 for conveying the workpiece beneath the scanning and portioning stations 24 and 28 (only a portion of the scanning/portioning conveyor belt 36 is shown for clarity).

With respect to scanning, the workpieces are inspected at the scanning station 24 to ascertain physical parameters of the workpiece pertaining to size and/or shape of the workpieces. Such parameters may include, for example, the length, width, aspect ratio, thickness, thickness profile, contour, outer contour configuration, perimeter, outer perimeter configuration, outer perimeter size and shape, and/or weight. The scanning station 24 may be of a variety of different types, including video cameras to view the workpiece illuminated by one or more light sources (not shown), such as in the scanning systems shown and described in U.S. Patent Application No. 62/431,374, U.S. patent application Ser. No. 15/824,938, and U.S. Pat. No. 5,585,605, the disclosures of which are hereby incorporated by reference in their entirety.

The portioning station 28 may include suitable high-speed liquid jet cutters (liquids may include, for example, water or liquid nitrogen) for portioning and/or trimming of the workpiece. Various types of liquid jet cutters can be utilized at portioning station 28 to cut or portion the workpiece or otherwise remove bones and other undesirable material from the workpiece as desired (collectively referred to as "portion" or "portioning"). For instance, one or more of the high-pressure waterjets as disclosed in U.S. Pat. Nos. 4,875,254, 5,365,186, 5,868,056, and 5,927,320, and incorporated herein by reference in their entirety, may be used.

In the exemplary high-speed portioning station 28, first, second, third, and fourth high-speed waterjet cutters 44a, 44b, 44c, and 44d are positioned along a length of the scanning/portioning conveyor belt 36 to achieve high throughput of the portioned/cut workpieces. In other embodiments, two, six, or eight (or any other suitable number, although often used in pairs of two) waterjet cutters may be used. Each waterjet cutter 44a, 44b, 44c, and 44d is carried/moved by a corresponding waterjet carrier assembly 46a, 46b, 46c, and 46d, which may be any suitable assembly adapted to carry a cutter assembly relative to the conveyer. For instance, the carrier assemblies 46a, 46b, 46c, and 46d may be similar to the carrier assembly shown and described in U.S. Patent Application Publication No. 20170108855, the entire disclosure of which is incorporated by reference herein. Once the portioning/trimming has occurred, the resulting portions are off-loaded from the cutting conveyor and placed on a take-away conveyor for further processing or, perhaps, to be placed in a storage bin.

Figure 2:
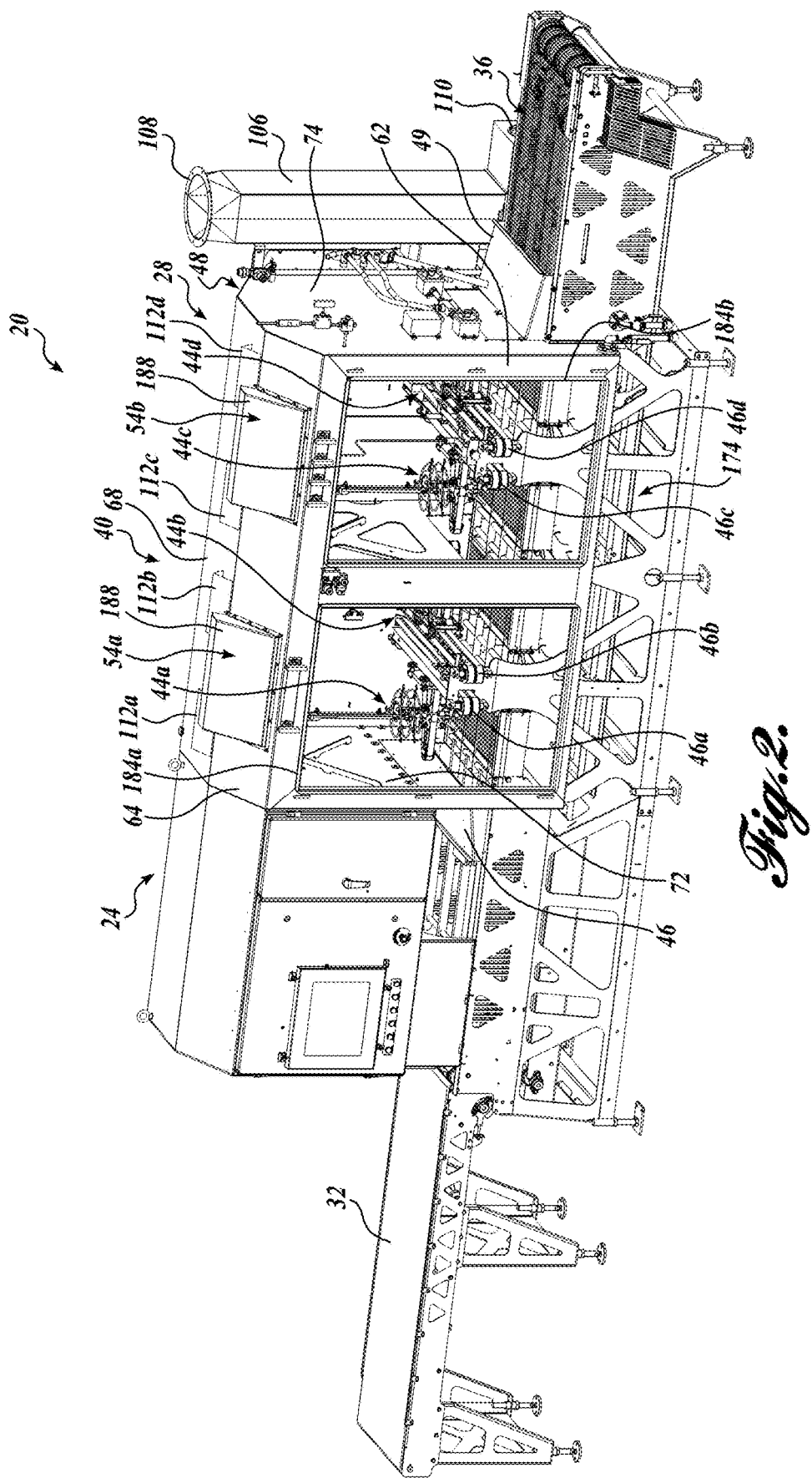
FIG. 2 is a front isometric view of the processing machine and mist management system of FIG. 1, showing front doors of the machine removed, wherein a portion of the conveyor belt is not shown for clarity.
Figure 3:
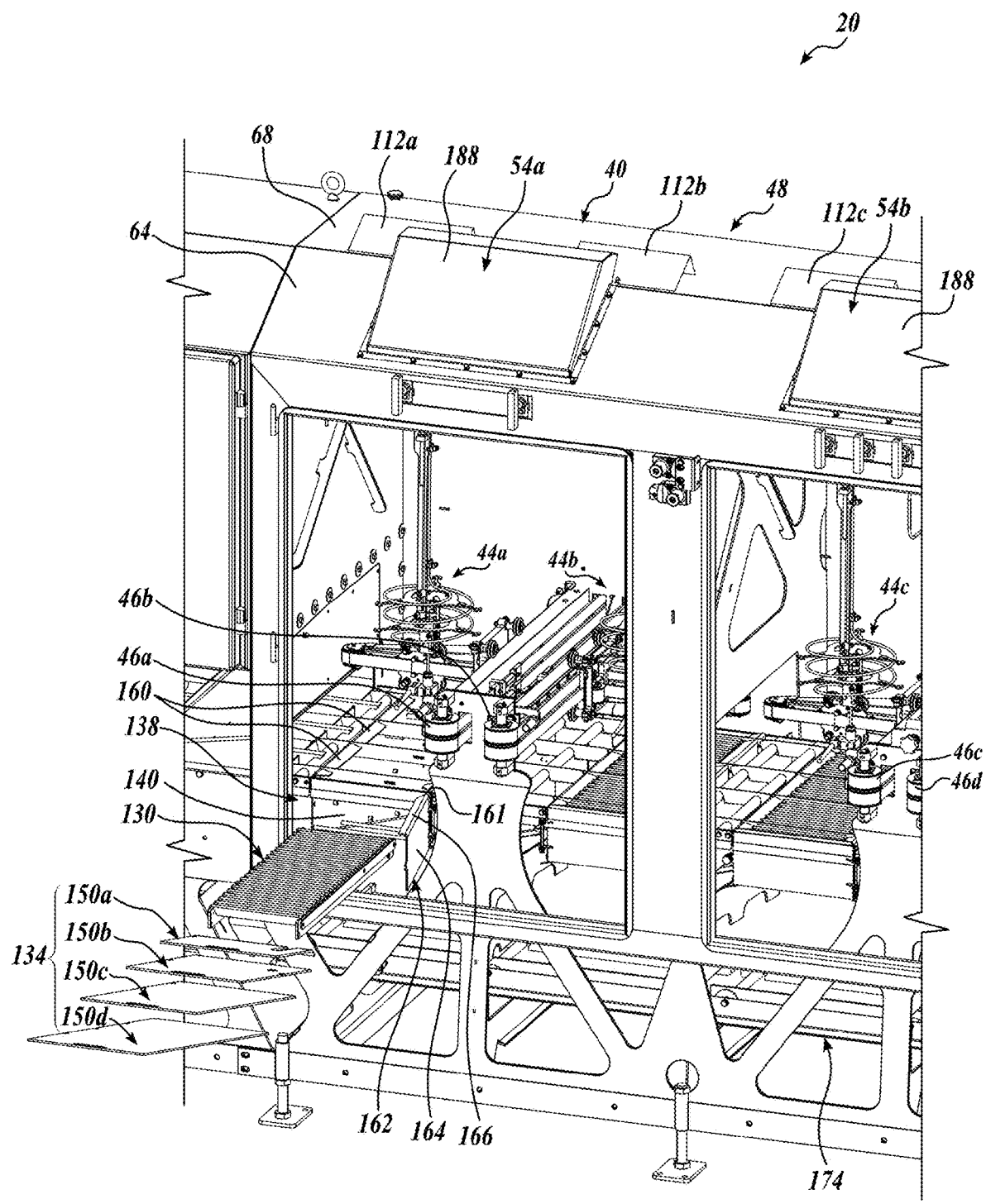
FIG. 3 is a front isometric view of a portion of the processing machine and mist management system of FIG. 1, wherein a portion of the mist management system is shown exploded.
Figure 4:
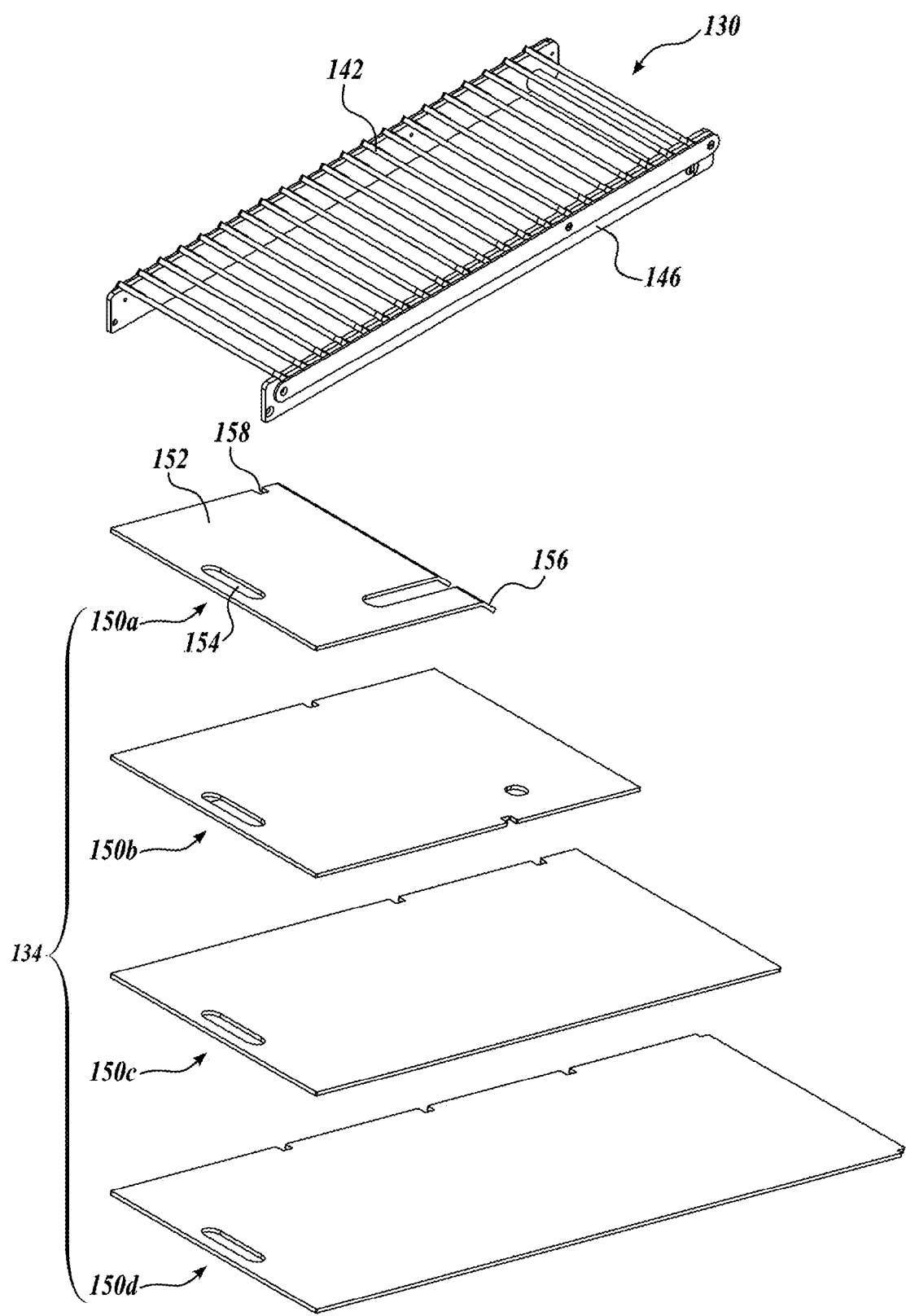
FIG. 4 is an isometric exploded view of the portion of the mist management system shown exploded in FIG. 3.

The waterjet cutters 44a, 44b, 44c, and 44d are housed within a portioner housing 48, which includes a front wall 62 having first and second windows 180a and 180b defined within first and second housing doors 182a and 182b that are configured to selectively enclose first and second access openings 184a and 184b within the front wall 62. The portioner housing 48 also includes a rear wall 60 opposite the front wall 62, a first hood portion 64 extending from the front wall 62, a third hood portion 66 extending from the rear wall 60, and a second hood portion 68 extending between the first and third hood portions 64 and 66. A floor 70 is defined opposite the first, second, and third hood portions (see FIG. 9), a first end wall 72 (see FIG. 2) is defined between the portioning station 28 and the scanning station 24, and a second end wall 74 is defined opposite the first end wall 72. It should be appreciated that the portioner housing 48 may instead include any other suitable configuration.

An exemplary mist management system 40 for use with the exemplary processing machine 20 or any other suitable machine having a portioning station with high-speed liquid jet cutters or any other mist-generating technology will now be described with reference to FIGS. 1-9. The mist management system 40 is generally configured to withdraw mist, droplets, drainage liquid, etc., from the portioner housing 48 to improve visibility within the machine, reduce interference with other features of the machine (such as the scanning station), improve hygiene and machine efficiency, and provide other benefits.

In order to better appreciate the benefits of the mist management system 40 and the corresponding method of managing mist within the machine, a general description of the mist flow within the machine without the mist management system 40 will first be described with reference to the FIGURES. In a prior art processing machine 20 not having a mist management system, the high pressure water leaves the orifice of a waterjet and passes through the work product and/or the open weave metal belt, and/or the waterjet deflects off of the work product and/or the metal belt, and/or the waterjet changes into mist as it leaves the waterjet orifice, and/or the waterjet passes through the belt and strikes and deflects off of the floor of the portioner machine housing, the return belt, or other structure.

As discussed above, when a waterjet stream strikes a hard surface, it will break up into mist and droplets. As such, the deflected water would create a large volume of mist and droplets within the portioner housing. The high volume of mist and droplets, as discussed above, would create obstruction of visibility into the machine and could migrate out of an inlet covering (see inlet covering 46 in FIG. 1) toward the scanning station 24, causing the issues discussed above.

The mist management system 40 of the present disclosure suitably evacuates a large volume of mist within the enclosed portioner housing to substantially eliminate the issues discussed above. The mist management system 40 generally includes a pressure distribution assembly configured to help evacuate the mist using pressure differences within the processing machine 20, a waterjet directing assembly configured to purposefully direct mist and deflected waterjet using the movement and momentum of the mist and/or waterjet, and a visibility assembly configured to improve visibility into the portioner housing during operation.

The pressure distribution assembly of the mist management system 40, which is generally configured to help evacuate the mist from the portioner housing 48 using pressure differences within the machine, will first be described in detail. The pressure distribution assembly generally includes a negative pressure plenum 50 located at the rear of the portioner station 28 that defines a negative or low pressure plenum chamber 80 for withdrawing the mist from the portioner housing 48, and first and second hood scoops 54a and 54b defined at an upper front portion of the portioner housing 48 for venting air into the portioner housing 48 and directing mist toward the plenum 50.

Figure 5:
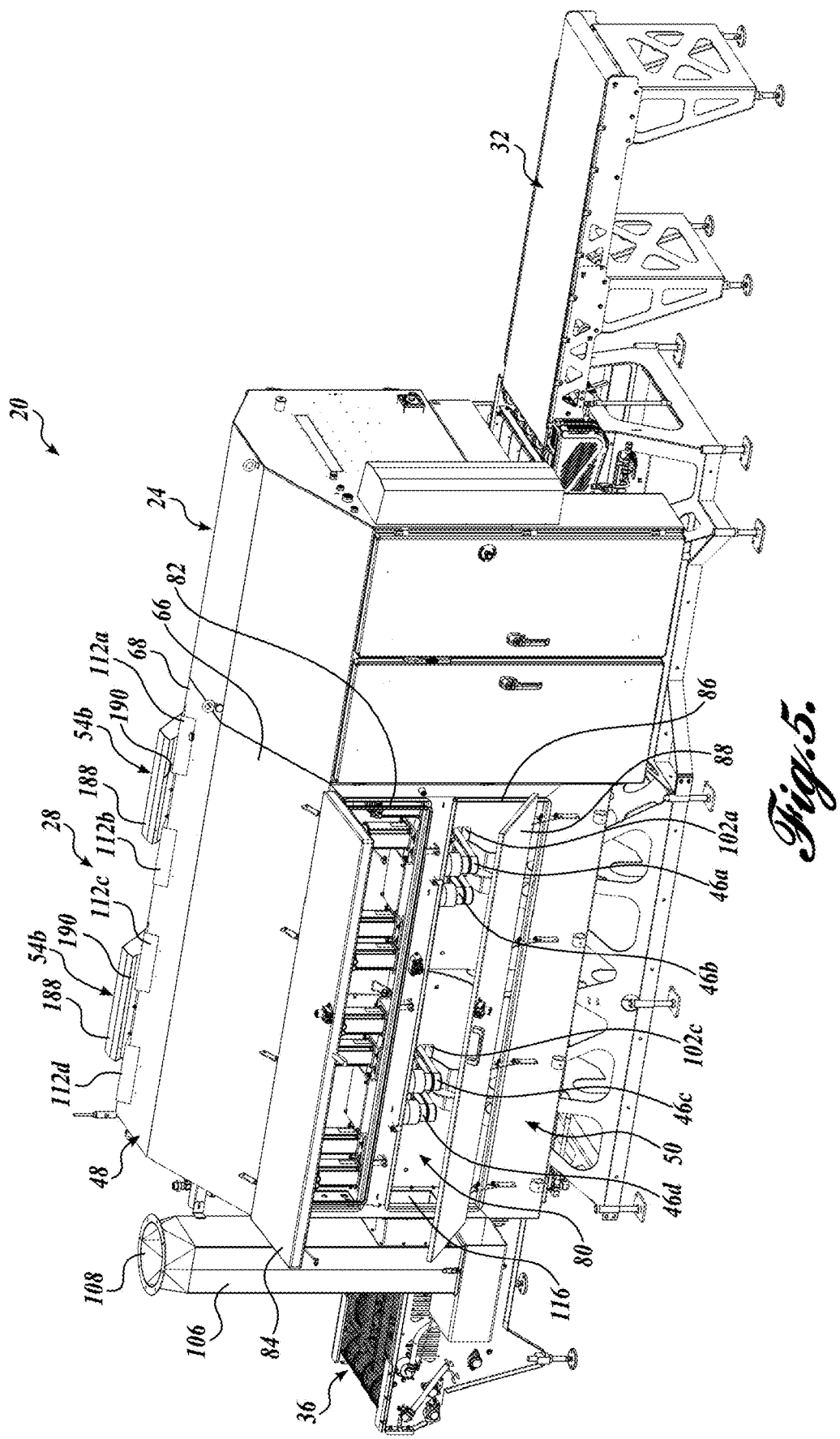
FIG. 5 is a rear isometric view of the processing machine and mist management system of FIG. 1.
Figure 6:
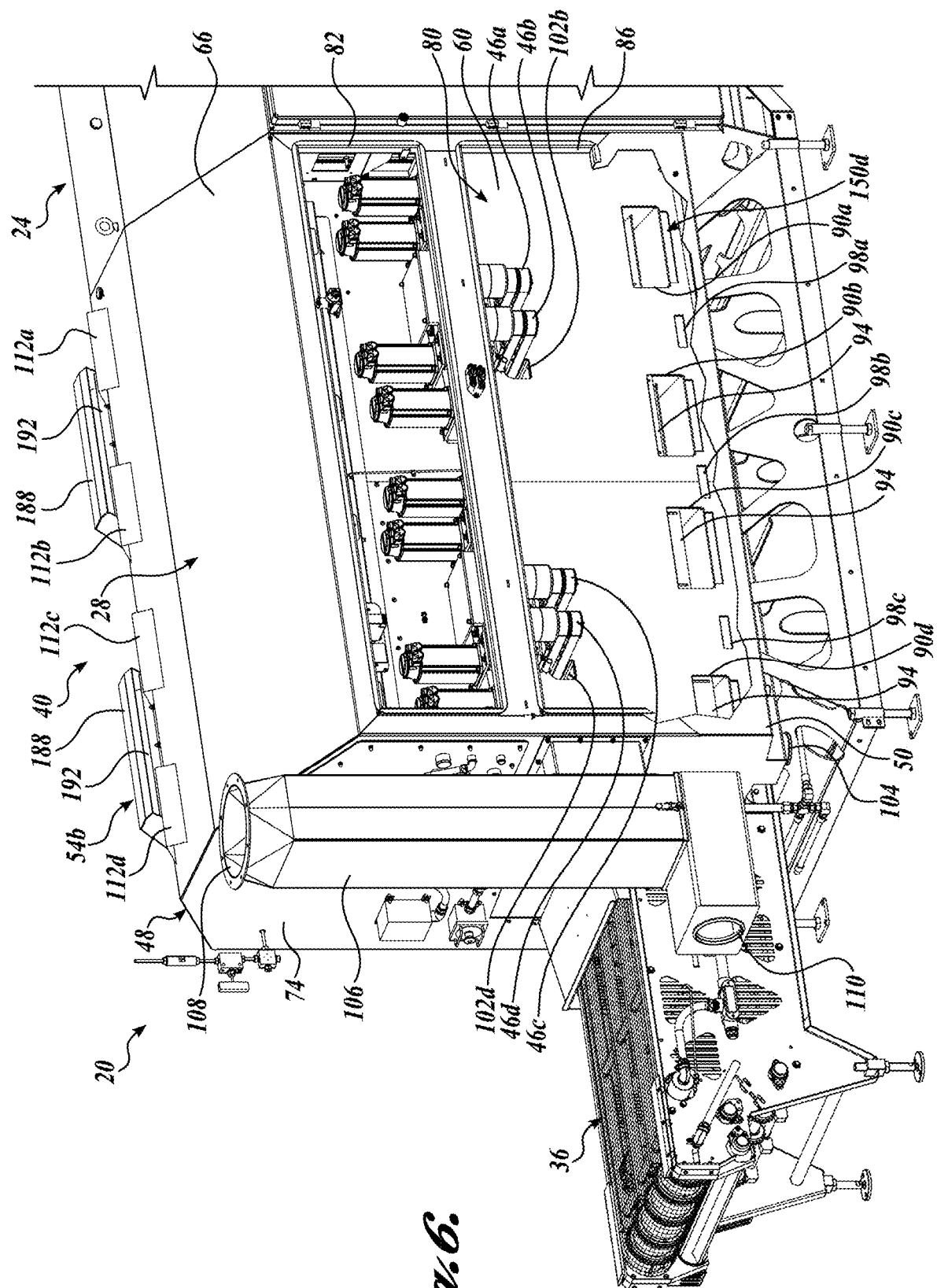
FIG. 6 is a rear partial isometric view of the processing machine and mist management system of FIG. 5, showing rear doors of the machine removed and a portion of the machine broken away.
Figure 8:
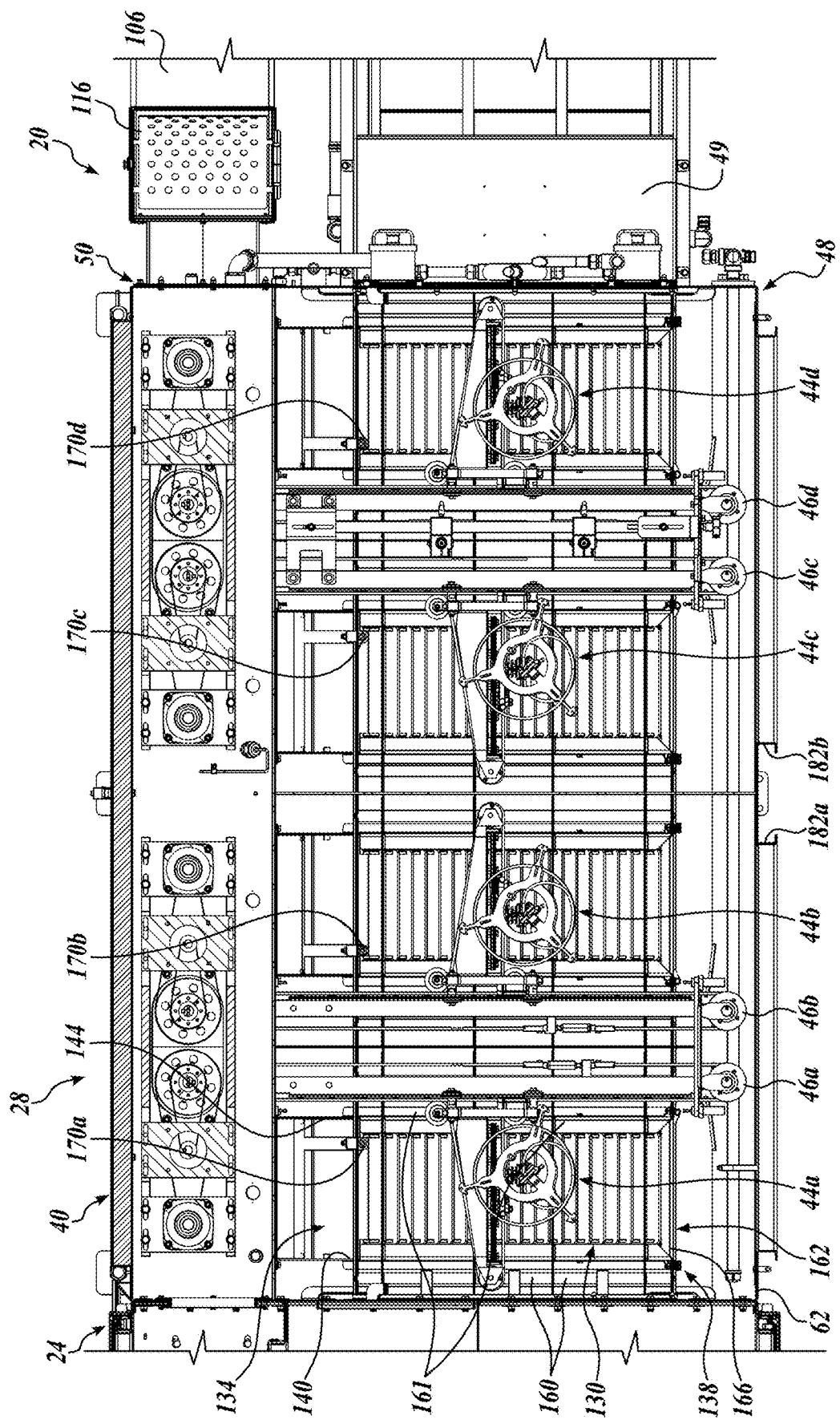
FIG. 8 is a top partial view of the processing machine and mist management system of FIG. 1.
Figure 9:
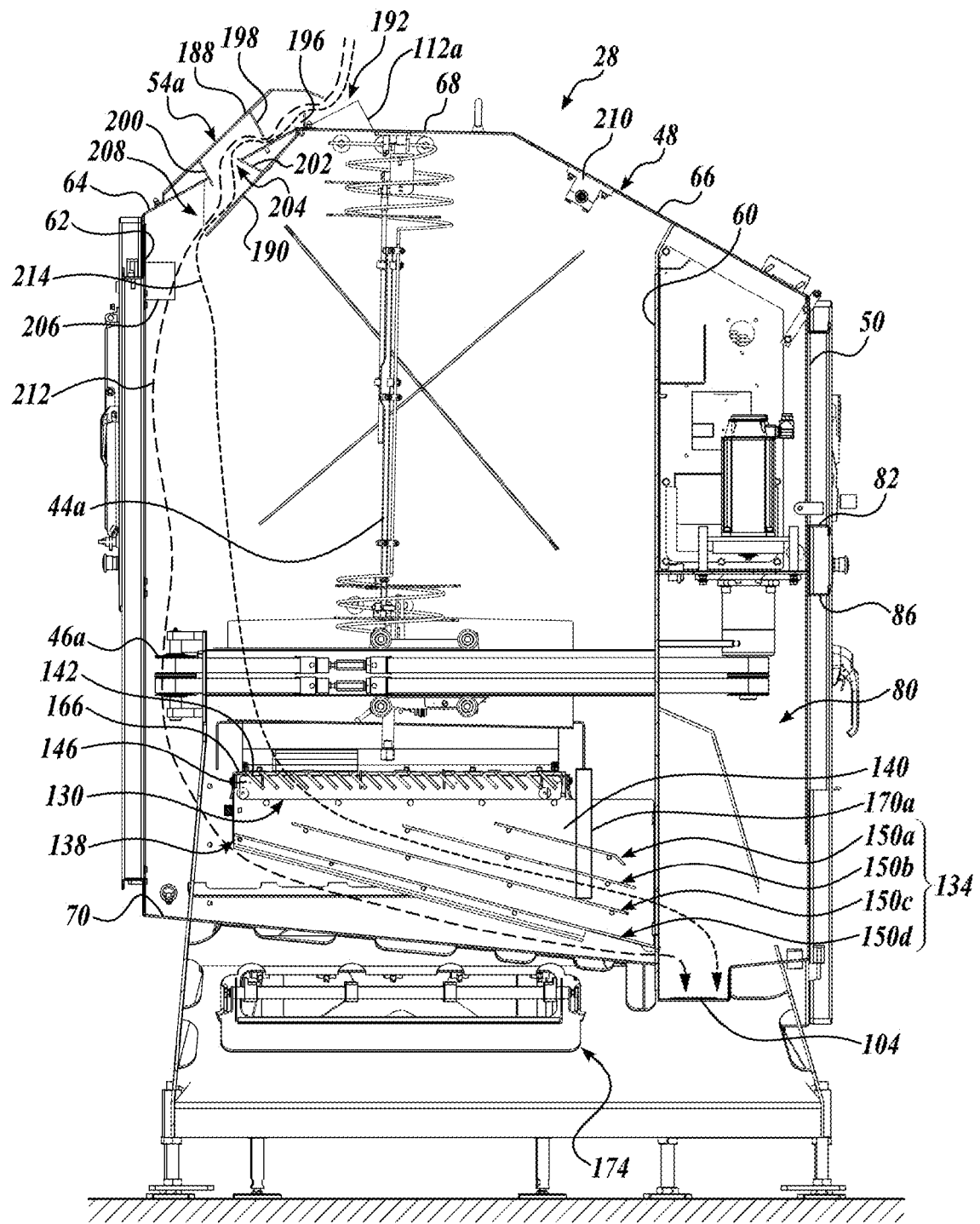
FIG. 9 is a side partially broken away view of the processing machine and mist management system of FIG. 1.

Referring to FIGS. 5, 6, and 8, the plenum 50 will first be described in detail. As noted above, the plenum 50 defines a low pressure plenum chamber 80 for withdrawing mist from the portioner housing 48. Referring to FIG. 5, the plenum 50 is generally rectangular in shape having an overall size that is substantially the same size as the rear wall 60 of the portioner housing 48. The hood portion of the plenum 50 (not separately labeled) is generally an extension of the third hood portion 66 of the portioner housing 48, as shown in FIG. 9. Moreover, the plenum 50 is of a predetermined depth (i.e., the dimension extending substantially transversely to the longitudinal path of the conveyor belts) to define a plenum chamber 80 that is suitably pressurized to withdraw mist from the portioner housing 48.

The plenum 50 may include one or more openings selectively coverable by a door or other covering for accessing the plenum chamber 80. In the depicted embodiment, the plenum 50 includes an upper access opening 82 selectively coverable by an upper door 84, and a lower access opening 86 selectively coverable by a lower door 88. It should be appreciated that the plenum 50 may instead be any suitable size, shape, and configuration to define an interior plenum chamber configured to carry out the functions and provide the benefits described herein.

Referring to FIGS. 6 and 9, wherein a portion of the plenum 50 has been broken away, the rear wall 60 of the portioner housing 48 defines part of the plenum cavity 80. The rear wall 60 includes a plurality of orifices defined along at least a portion of its length for allowing mist to flow from the interior of the portioner housing 48 into the plenum cavity 80 due to the pressure difference between the portioner housing 48 and the plenum 50. In general, the plenum 50 is overly sized relative to the orifices so that the pressure drop along the length of the plenum is very small relative to the large pressure drop across each relatively small orifice.

Any suitable size, number, or arrangement of orifices may be defined in the rear wall 60 to allow a suitable amount of mist to be evacuated from the portioner housing 48 during operation of the waterjet cutters 44a, 44b, 44c, and 44d. In the depicted embodiment, first, second, third, and fourth orifices 90a, 90b, 90c, and 90d are defined near a bottom edge of the rear wall 60. The first, second, third, and fourth orifices 90a, 90b, 90c, and 90d are substantially the same size and shape (in the depicted embodiment, rectangular) and are spaced along the bottom portion of the rear wall 60 such that each orifice is in substantial alignment with a corresponding waterjet cutter 44a, 44b, 44c, and 44d. However, the orifices may instead vary in size, shape, and location to control and/or substantially equalize the pressure drop along the length of the plenum 50.

In that regard, each orifice 90a-90d may be adjustably covered with an orifice cover 94 to increase or decrease the size of the orifice, thereby increasing or decreasing the pressure drop across the orifice. The depicted embodiment shows an orifice cover 94 covering a portion of the second, third, and fourth orifices 90b, 90c, and 90d. The orifice cover 94 is arranged on each of the second, third, and fourth orifices 90b, 90c, and 90d such that the size of the orifices decreases from the first orifice 90a to the fourth orifice 90d. The first orifice 90a is shown with no orifice cover 94 such that it is has its full size opening. The orifice cover 94 may be adjustably secured on the rear wall 60 in any suitable manner, such as by passing bolts through slots in the cover 94 and securing them in the rear wall 60.

The plenum 50 further includes first, second and third floor level orifices 98a, 98b, and 98c defined near the bottom edge of the rear wall 60 (substantially at the level of the floor 70) in between the first and second orifices 90a and 90b, the second and third orifices 90b and 90c, and the third and fourth orifices 90c and 90d, or at any other suitable location. As the waterjets break up they create mist, but a significant portion of the waterjet remains as water (or another fluid) that must be drained from the machine. Additionally, some mist condenses into water that requires draining. Water in the portioner housing 48 enters the plenum 50 through the floor level orifices 98a, 98b, and 98c and is thereafter drained. In that regard, the plenum 50 includes a drain 104 defined in a corner of the plenum 50 at a sloped end of a plenum floor (not shown). The drain 104 may be in communication with a fluid conduit to carry the fluid to a facility drain.

The floor level orifices 98a, 98b, and 98c may be substantially the same size and shape (in the depicted embodiment, rectangular). However, the floor level orifices may instead vary in size, shape, and location to control and/or substantially equalize the pressure drop along the length of the plenum 50. In any event, the floor level openings 98a, 98b, and 98c as well as other orifices are sufficiently large to allow small pieces of debris to pass through, but also sufficiently small enough to adequately restrict the air flow into the plenum for controlling the air flow through the machine.

Additional orifices, and specifically, first, second, third, and fourth waterjet carrier orifices 102a, 102b, 102c, and 102d may be included to allow the waterjet carrier assembly 46a, 46b, 46c, and 46d of each waterjet cutter 44a, 44b, 44c, and 44d to protrude into the plenum chamber 80. Moreover, the waterjet carrier orifices 102a, 102b, 102c, and 102d help to quickly evacuate the mist formed when the waterjet strikes the belt and/or the workpiece during the portioning process, as opposed to merely evacuating the mist when it reaches the lower area of the portioner housing 48.

It should be appreciated that any other suitable configuration of orifices and/or additional orifices may be included to control the pressure drop along the length of the plenum 50 and the mist flow into the plenum 50. The size and pattern of orifices will depend upon the shape and size of the plenum, the number of waterjet cutters (e.g., four cutters vs. eight cutters) the capacity and/or location of any suction source, and other factors. For instance, in a processing machine using less than four waterjet cutters (such as two) or more than four waterjet cutters (such as eight), the orifices may be reconfigured such that the pressure drop along the length of the plenum 50 is substantially level, even with the suction force defined at one end of the plenum. In this manner, the mist management system 40 may be used with only a single suction source, and thereafter configured for optimal mist evacuation. The plenum 50, with a suitable configuration of orifices, helps distribute pressure differences and airflow amounts along the length of the portioner housing 48 to manage air and mist flow.

The plenum 50 is in pneumatic communication with a suction source such as high capacity exhaust blower or fan (not shown). The plenum 50 may be in pneumatic communication with the exhaust fan through a suitable air duct 106 having a first exhaust opening 108 suitable to be placed into communication with the fan, a second vent opening 110 for venting air into the plenum 50, and a third suction opening 116 for evacuating mist and air from the plenum 50. As can be seen in FIGS. 5 and 8, the third suction opening 116 may include a sloped or otherwise contoured interior surface to direct air/mist from the plenum 50 up into the air duct 106 and out the exhaust opening 108. In addition, the sloped interior surface of the third suction opening 116 may include one or more openings for placing the suction opening 116 into pneumatic communication with the vent opening 110.

Of course, the plenum 50 may instead be placed into pneumatic communication with the exhaust fan without the use of an air duct or in any other suitable manner. The exhaust fan may be located near the processing machine 20, in other areas of the processing facility (such as at the outfeed end of the exhaust ducting on the roof of the processing facility), or at another location using ducting well known in the art.

The exhaust fan generates negative pressure in the plenum 50 to cause mist to flow into the plenum 50 (but not from the plenum into the portioner housing 48). In other words, the mist will naturally flow from the area of higher pressure (i.e., the portioner housing 48) to the area of lower pressure (i.e. the plenum 50), thereby evacuating the mist from the portioner housing 48. The exhaust fan is of a suitable capacity to continuously withdraw mist from the portioner housing 48 through the plenum 50. One of ordinary skill in the art could choose a suitable exhaust fan based on at least one of the pressure of the waterjet cutters, the number of waterjet cutters used, the static pressure, the mist/air density being exhausted, and other factors.

For instance, the pressure of the waterjet cutters may be between 45000 PSI-85000 PSI, depending on the intended application of the portioner station 28. Moreover, as noted above, the portioning station 28 may use only two waterjet cutters (causing less mist generation and/or defining a smaller evacuation area than using four waterjet cutters), eight waterjet cutters (causing more mist generation and/or defining a larger evacuation area than using four waterjet cutters), or another number of waterjet cutters.

The static pressure, or the amount of pressure the exhaust fan has to push and pull against to move air/mist through a duct system, will vary based on the ducting used to exhaust the air/mist. As a specific example, the static pressure may be calculated from the size, shape, material, length, path, etc., of the ducting used to pneumatically connect the plenum and the exhaust fan and/or to pneumatically connect the exhaust fan and a facility outlet. The static pressure will also depend on the density of the mist/air being exhausted, which will depend upon the pressure of the waterjet cutters, the number of waterjet cutters used, the temperature of the air/mist, etc.

At least some of the above factors can be considered when choosing a suitable exhaust fan for the mist management system 40. For instance, if a certain waterjet pressure is used (PSI), it may be determined based on experimentation that a fan having a certain airflow (CFM) (assuming a maximum static pressure) is necessary for suitably evacuating the mist from the portioner station 28. As a specific example, in a portioner station using four waterjet cutters similar to that shown in the FIGURES, each with a waterjet pressure of about 55000 PSI, a fan having an airflow of about 2000 CFM will sufficiently evacuate mist from the portioner station (assuming a static pressure of less than about 1 inWG). Moreover, using a standard fan curve available for a specific exhaust fan model, it may be determined that if the static pressure is less than a certain amount, an exhaust fan having a first predetermined power and output may be used, wherein if the static pressure is greater than a certain amount, an exhaust fan having a second, higher predetermined power and output may be used.

In one embodiment, the exhaust fan is controlled by a variable frequency drive (VFD), as is well known in the art, such that the fan speed can be varied for added control and efficiency. In such an embodiment, the fan speed can be varied to control the CFM to account for the waterjet pressure, the number of waterjets used, the static pressure, the air density, etc. A higher capacity fan producing a higher output CFM range may be needed to account for one or more of the above-noted factors. In general, using an exhaust fan of slightly higher capacity than needed will suitably evacuate the mist from the portioner station 28. In the four waterjet cutter embodiment depicted in the FIGURES, the inventors have found that the PLA30ST4P model fan available from Plastec Ventilation Inc., of Bradenton Florida is suitable for evacuating mist in most conditions. This is be exemplified in the EXPERIMENT section below.

The exhaust fan speed is of a selected minimum velocity to continuously withdraw mist from the portioner housing 48 and of a maximum velocity to substantially prevent any movement of the workpieces on the belt. If the airflow is too low, the mist may not be completely evacuated, and/or the airflow through the hood scoops 54a and 54b may not be sufficient to direct mist and splash away from the windows 180a and 180b.

If the airflow is too great, it may generate high velocities of air at certain areas, such as the inlet and outlet of the portioner housing 48, causing movement of the work pieces and inaccurate cutting. It is also beneficial to minimize the air flow within the machine to minimize the amount of filtered, conditioned plant air used in evacuating the portioner housing 48. The fan speed and/or the orifices can be adjusted as needed to balance the air flow through the machine 20.

The fan speed and/or the orifices can also be configured to balance the airflow if one or more of the waterjet cutters 170a, 170b, 170c, and/or 170d are run with certain pressure levels, with certain sized waterjet orifices, etc. For instance, the mist volume generated by each waterjet cutter can differ, and the corresponding orifices in the plenum 50 may be adjusted in size to accommodate a larger or smaller volume of mist. However, it can also be appreciated that the mist management system 40 is configured to adequately withdraw mist from the portioner housing 48 with many different waterjet configurations without adjustment of the fan speed and/or the orifices.

Air enters the portioner housing 48 to balance the pressure differences caused by the exhaust fan through one or more vents or openings in the portioner housing 48. In the depicted embodiment, air enters the portioner housing 48 through the first and second hood scoops 54a and 54b as well as one or more optional air vents, such as first, second, third, and fourth air vents 112a, 112b, 112c, and 112d. In the depicted embodiment, the first and second hood scoops 54a and 54b are positioned on the first hood portion 64 above the first and second windows 180a and 180b. The first and second hood scoops 54a and 54b are configured to direct incoming air downwardly toward the interior of the first and second windows 180a and 180b to help clear off any droplets, spray, and/or condensation on the interior of the windows as well as to help direct mist downwardly toward a portion of the waterjet directing assembly, as will be described below.

The first and second hood scoops 54a and 54b are substantially identical; and therefore, only the first hood scoop 54a will be described in detail. As can be seen by referring to at least FIGS. 1, 6 and 9, the first hood scoop 54a includes an exterior scoop body 188 that is configured to inlet air into the portioner housing 48, and an interior scoop body 190 in communication with the exterior scoop body 188 that directs the inletted air within the portioner housing 48.

The exterior scoop body 188 is generally rectangular in overall shape (or any other suitable shape) and tapers in height relative to the exterior surface of the first hood portion 64 as it extends toward the front wall 62 of the portioner housing 48. The upper, less tapered end of the exterior scoop body 188 includes an exterior scoop inlet 192 defined between a downwardly or inwardly turned edge 194 and the first hood portion 64 of the portioner housing 48. The configuration of the downwardly or inwardly turned edge 194 can be optimized to decrease the size of the exterior scoop inlet 192 for controlling airflow into the portioner housing 48 and for helping to redirect the sound waves of the waterjet cutters back into the portioner housing 48. Moreover, an optional first internal baffle 196 extends upwardly from the first hood portion 64 toward the inwardly turned edge 194 to further decrease the size of the exterior scoop inlet 192 and/or for redirecting the sound of the waterjet cutters back into the portioner housing 48.

An exterior scoop outlet 204 is defined nearer the lower, tapered end of the exterior scoop body 188 at an opening in the first hood portion 64. The exterior scoop outlet 204 also defines an inlet opening of the interior scoop body 190, which includes an interior scoop outlet 208 at its opposite end that is in pneumatic communication with the interior of the portioner housing 48. The interior scoop body 190 is also generally rectangular in overall shape (or any other suitable shape) and tapers in height relative to the interior surface of the first hood portion 64 as it extends away from the front wall 62 of the portioner housing 48. In this manner, the interior scoop body 190 directs air downwardly across the window 180a to help clear any mist, condensation, spray, etc., as well as downwardly toward a portion of the waterjet directing assembly (and eventually toward the plenum 50).

Additional internal baffles may be included for controlling the air flow within the hood scoop 54a and/or for redirecting sound waves of the waterjet cutters 44a-44d back into the portioner housing 48. Any suitable internal baffling may be used, such as a plurality of staggered, opposing baffles. For instance, in the depicted embodiment, a second internal baffle 198 may extend downwardly from the surface of the exterior scoop body 188 at a location between the first internal baffle 196 and the tapered end of the exterior scoop body 188, and a third internal baffle 200 may extend downwardly from the surface of the exterior scoop body 188 at a location between the second internal baffle 198 and the tapered end of the exterior scoop body 188. A fourth internal baffle 202 may extend upwardly from the surface of the interior scoop body 190 at a location between the second internal baffle 198 and the third internal baffle 200. As such, the air must flow through the hood scoop 54a in a serpentine-like manner, as shown by the first and second flow paths 212 and 214.

The internal baffling helps control the amount and rate of air flowing into the portioner housing 48 to appropriately remove mist, spray, condensation, etc., from the window 180a as well as to move mist toward the plenum 50. In addition, the staggered, opposing baffles help redirect the sound waves of the waterjet cutters 44a-44d back into the portioner housing 48. In that regard, the internal baffling, inlet opening size, outlet opening size, and shape of the hood scoop 54a may be adjusted as needed to control the air flow into the portioner housing 48 and minimize the noise of the waterjet cutters.

The exterior and/or interior scoop bodies 188 and 190 may be removable attached to the portioner housing 48 for cleaning, adjustment, etc. Any suitable structure may be used for removably attaching the exterior and/or interior scoop bodies 188 and 190 to the portioner housing 48. For instance, the scoop body may be hingedly secured to the portioner housing 48 at one end, and selectively securable to the portioner housing 48 at the other end with a cam-like locking mechanism or the like.

As noted above, air may also enter the portioner housing 48 through optional first, second, third, and fourth air vents 112a, 112b, 112c, and 112d. The air vents 112a-112d are shown located on the second hood portion 68 and spaced substantially equally along the length thereof. It should be appreciated that any suitable additional venting may be used as needed to control the air flow through the portioner housing 48.

The waterjet directing assembly configured to purposefully direct the mist toward the plenum 50 using the movement and momentum of the mist will now be described in detail. The waterjet directing assembly generally includes a sound baffle assembly 130 and a deflecting panel assembly 134 removably received within a tray 138 beneath each waterjet cutter 44a-44d, at least one sound tube 170a-170d for each waterjet cutter when not in use, a specifically sloped floor 70 of the portioner housing 48 for directing mist and condensate toward the plenum 50, and a specifically located return belt assembly 174 of the scanning/portioner conveyor belt 36.

Referring to FIGS. 3, 4, 9, and 10, each sound baffle assembly 130 is generally configured to direct waterjet and mist from a corresponding waterjet cutter 44a-44d toward at least one of the deflecting panel assembly 134, the sloped floor 70, and the plenum 50. In that regard, each sound baffle assembly 130 is positioned beneath the portion of the scanning/portioning conveyor belt 36 that supports a workpiece being portioned by a corresponding waterjet cutter 44a-44d, and the sound baffle assembly 130 is generally the same size as or is slightly larger than the waterjet cut envelope (i.e., the area in which the waterjet cutter can be moved to cut product on the belt).

Each sound baffle assembly 130 includes a plurality of sound baffles 142 received within a baffle frame 146 that extends lengthwise substantially across the width of the scanning/portioning conveyor belt 36. The baffle frame 146 is secured within first and second opposing side walls 140 and 144 (see FIG. 8) of the tray 138 in any suitable manner, such as by sliding engagement with one or more slide rails, pins, or other protrusions within the interior of the tray 138.

The sound baffles 142 are generally rectangular in shape having a length that is substantially equal to the width of the baffle frame 146. The sound baffles 142 are arranged transversely within the frame 146 such that the length of each sound baffle is substantially parallel to the longitudinal axis of the scanning/portioning conveyor belt 36. The sound baffles 142 are also arranged an angle within the frame 146 (i.e., offset from horizontal) such that portions of the waterjet will strike one or more sound baffles 142 during the portioning process, and portions of the waterjet will pass through the sound baffle assembly 130. In one embodiment, the sound baffles 142 are removably received in the frame 146 (such as within slots) such that the sound baffles 142 may be replaced when needed, such as when worn or when customization is needed for certain applications.

Each sound baffle 142 is of an optimal length, thickness, width, material, etc., as well as at an optimal angle and spacing within the baffle frame 146 to suitably deflect waterjet and mist that travel through the belt 32 toward the plenum 50. For instance, in one example using a waterjet between about 45,000 psi and 85,000 psi, the sound baffle assembly 130 is arranged to include sound baffles that are about 2 inches×10 inches×0.25 inches thick, positioned within the baffle frame 146 at angle between about forty and fifty degrees, such as a forty-five degree angle, and spaced about 1.25 inches apart. The spacing can be adjusted to reduce splashback from the waterjets while still allowing the waterjets to hit a sound baffle before the waterjet starts to break up. In such an example, the sound baffles 142 are made from a suitable hard material that is food safe, such that the sounds baffles 142 can withstand the force of the waterjet. Using these optimal dimensions, materials, and orientations of the sound baffles 142 within the baffle frame 146, the waterjet and mist traveling through belt 36 is deflected toward at least one of the deflecting panel assembly 134, the sloped floor 70, and the plenum 50 when it strikes or passes through the sound baffles 142, as shown in the first flow path 212 shown in FIG. 9.

The sound baffle assembly 130 also provides the added benefit of minimizing the sound waves caused by the waterjet during the portioning process. Sound levels generated by the breaking up of the waterjet can reach over 100 dB, and so it will require hearing protection by operators. The sound baffles 142 break up the waterjet before it creates substantial noise.

The deflecting panel assembly 134 is disposed beneath the sound baffle assembly 130 for further deflecting and directing waterjet and mist that travels through the belt 36 and the sound baffle assembly 130. The deflecting panel assembly 134 includes at least one elongated panel disposed beneath the sound baffle assembly 130 that extends substantially across the width of belt 36 and is secured at a predetermined angle (offset from horizontal) within the tray 138. In the depicted embodiment, the deflecting panel assembly 134 includes first, second, third, and fourth deflecting panels 150a, 150b, 150c, and 150d secured within the tray 138 beneath the sound baffle assembly 130. Each deflecting panel 150a-150d is substantially similar, and therefore, only the first deflecting panel 150a will be described in detail.

The first deflecting panel 150a includes an elongated panel body 152 having a suitable length that extends substantially transversely across at least a portion of the conveyor belt 36 and a width that is substantially equal to or is slightly greater than the width of the sound baffle assembly 130. A handle 154 may be defined at the first end of the body 152 (opposite the plenum 50) and a deflecting panel lip 156 may be defined at the second opposite end of the body 152 that extends downwardly at an angle from the elongated panel body 152 a predetermined distance. The first deflecting panel 150a may further include one or more notches 158 along its lateral edges or other cavities or openings that are configured to receive corresponding features in the tray 138 for removably securing the deflecting panel within the tray 138. In that regard, the first deflecting panel 150a may be removably secured within the tray 138, such as by resting on pins, etc., such that it may be replaced when needed. The first deflecting panel 150a is made from a suitable material to withstand the force of the waterjet, such as hard metal that is food safe As can be seen in FIG. 9, the first, second, third, and fourth deflecting panels 150a, 150b, 150c, and 150d are secured within the tray 138 such that each deflecting panel is at an optimal slope (angled downwardly toward the plenum 50 relative to horizontal) for redirecting the mist and waterjet down into the plenum without consuming valuable vertical space within the portioner housing 48. Through calculation and experimentation, it has been found by the inventors that the slope of the deflecting panels 150a, 150b, 150c, and 150d should be greater than about 10 degrees (10°) to prevent reflection of the waterjet back up towards the belt 36 and to effectively direct the waterjet towards the plenum 50. At the same time, the slope of the deflecting panels 150a, 150b, 150c, and 150d should be less than about 20 degrees (20°) to limit the vertical fall (i.e., the vertical distance between the belt 36 and the floor 70) of the portioner housing 48, which is typically restricted for processing machines that are efficiently designed to stand on the processing plant floor with the portioning belt at human operator height. In the depicted embodiment, the first, second, third, and fourth deflecting panels 150a, 150b, 150c, and 150d are secured within the tray 138 such that each deflecting panel is at a substantially fifteen degree (15°) angle relative to horizontal (angled downwardly toward the plenum 50).

The first, second, third, and fourth deflecting panels 150a, 150b, 150c, and 150d are also arranged in somewhat of a cascade fashion. In that regard, the first deflecting panel 150a is of a first predetermined length, the second deflecting panel 150b is of a second predetermined length longer than the first predetermined length and is disposed beneath the first deflecting panel 150a, the third deflecting panel 150c is of a third predetermined length longer than the second predetermined length and is disposed beneath the second deflecting panel 150b, and the fourth deflecting panel 150d is of a fourth predetermined length that is longer than the third predetermined length and is disposed beneath the third deflecting panel 150c. With the deflecting panels arranged in this manner, the waterjet and mist that passes through the belt 36 and the sound baffle assembly 130 is guided toward the plenum 50.

Moreover, the fourth deflecting panel 150d of each deflecting panel assembly 134 is also arranged to guide any mist, condensation, water, etc., into the plenum 50 through the corresponding first, second and third orifices 90a, 90b, and 90c. In that regard, the fourth deflecting panel 150d of each deflecting panel assembly 134 is substantially the same width as each corresponding orifice 90a, 90b, and 90c, and an end portion of the fourth deflecting panel 150d (such as a lip) can rest on the bottom edge of each auxiliary orifice 90a, 90b, and 90c and/or partially extend into the plenum cavity 80, as shown in FIG. 9. The mist, condensation, water, etc., in the plenum 50 flows out of the drain 104 defined in the corner of the plenum 50.

In an alternative embodiment, the deflecting panel assembly 134 includes only the fourth deflecting panel 150d. In other alternative embodiments, the deflecting panel assembly 134 is eliminated from the mist management system 40. Accordingly, the descriptions and illustrations provided herein should not be seen as limiting.

As noted above, the sound baffle assembly 130 and deflecting panel assembly 134 may be removably secured between the opposing sidewalls 140 and 144 of the tray 138 in any suitable manner, such as by sliding engagement of one or more slide rails, pins, or other protrusions within the interior of the tray 138 with one or more notches, openings, etc., on the sound baffle assembly 130 and the deflecting panel assembly 134 (or vice versa). The tray 138 is secured within the portioner housing 48 beneath the scanning/portioning conveyor 36 in any suitable manner, such as by securing (removably or not) the opposing sidewalls 140 and 144 to the floor 70 of the portioner housing 48 through a frame, brackets, or otherwise.

The tray 138 also includes waterjet directing features to help redirect any spray reflected from the sounds baffles 142 and/or the deflecting panels 150a-150d toward the plenum 50. When the waterjet impacts one or more of the deflecting panels 150a-150d, the waterjet spray will spread downhill and sideways (along the length of the belt). In that regard, the tray 138 include first and second pairs of lateral tray lips 160 and 161 defined on upper elongated edges of the opposing sidewalls 140 and 144. The lateral tray lips 160 and 161 extend inwardly and slightly downwardly from the upper edges toward the sound baffle assembly 130. In this manner, any "sideways" spray deflection is substantially contained by allowing the spray to travel up the walls 140 and 144 of the tray 138 and then back downwards by the downwardly angled interior (lower) surface of the lateral tray lips 160 and 161. The downwardly angled exterior (upper) surface of the lateral tray lips 160 and 161 can also beneficially help direct waterjet and mist downwardly toward the sound baffle assembly 130 and the deflecting panel assembly 134.

The tray 138 also includes a tray door 162 that may be used to selectively enclose the sound baffle assembly 130 and the deflecting panel assembly 134 within the tray 138. The tray door 162 is defined at the front of the tray 138 (near the windows of the portioner station 28) and may be hingedly secured to the body of the tray 138 in any suitable manner. When in a closed position relative to the body of the tray 138, a front panel 164 of the tray door 162 substantially encloses a front open end of the tray 138. A tray door lip 166 is defined along an upper edge of the front panel 164 and extends inwardly and slightly downwardly toward the sound baffle assembly 130 when the tray door 162 is in the closed position. Similar to the lateral tray lips 160 and 161, the interior (lower) surface of the tray door lip 166 helps redirect and contain any deflected waterjet spray traveling up the interior surface of the front panel 164. The downwardly angled exterior (upper) surface of the tray door lip 166 can also beneficially help direct waterjet and mist downwardly toward the sound baffle assembly 130 and the deflecting panel assembly 134.

As can be appreciated from the foregoing, the sound baffle assembly 130, deflecting panel assembly 134, and tray 138 collectively direct the waterjet of the corresponding waterjet cutter 44a-44d toward the plenum 50. In addition, the sound baffle assembly 130, deflecting panel assembly 134, and tray 138 collectively act as ducting for the air and mist flowing through the portioner housing 48 toward the low pressure plenum chamber 80. Moreover, the sound baffle assembly 130, deflecting panel assembly 134, and tray 138 allow for modularization of the waterjet directing assembly. If a waterjet cutter is added or removed from the portioner station 28 (such as when using two waterjet cutters or eight waterjet cutters), a corresponding number of trays 138/sound baffle assemblies 130/deflecting panel assemblies 134 may be added or removed.

Figure 7:
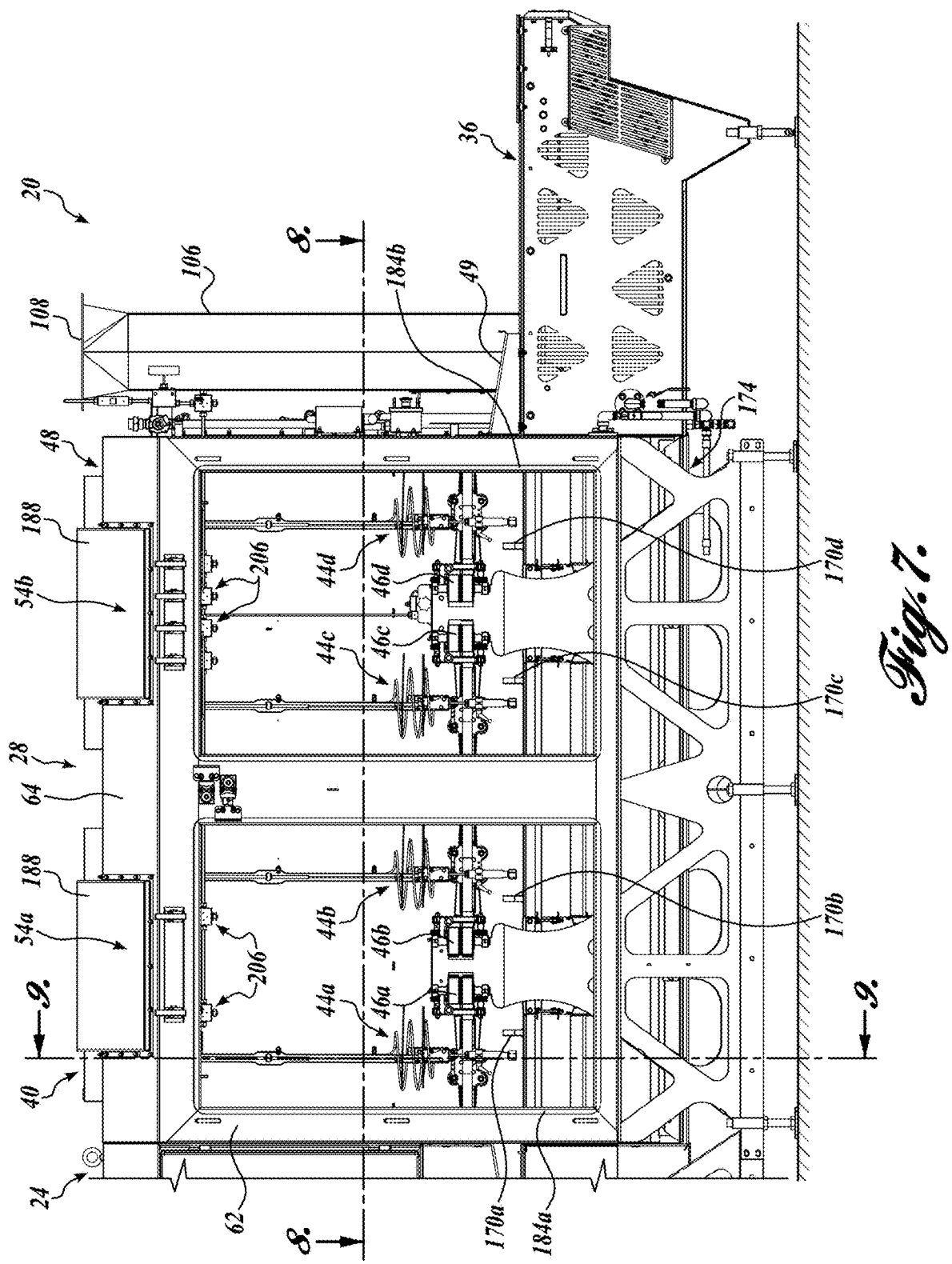
FIG. 7 is a front partial view of the processing machine and mist management system of FIG. 1.

Referring to FIGS. 7-9, the waterjet directing assembly further includes first, second, third, and fourth sound tubes 170a, 170b, 170c, and 170d configured to receive the waterjet of its corresponding waterjet cutter 44a-44d when idle (i.e., when it is not being used for portioning). Each sound tube 170a-170d is generally configured to direct the corresponding waterjet toward the plenum 50 when idle. In that regard, the sound tubes 170a-170d are each positioned near the rear wall 60 of the portioner housing 48 behind the edge of the belt 36. When the waterjet cutter is not being used to portion a workpiece, it is moved along its respective carriage assembly 46a-46d off the belt 36 until the waterjet of the cutter is in substantial alignment with the opening in the sound tube.

Each sound tube 170a-170d is positioned substantially vertically to capture and direct the waterjet from the waterjet cutter 44a-44d substantially straight downward toward the floor 70 of the portioner housing 48. In the depicted embodiment shown in FIG. 9, the sound tubes 170a-170d are positioned above the deflecting panel assembly 134 such that the waterjet and/or mist from the waterjet cutter travels through the sound tube and strikes one or more of the deflecting panels of the deflecting panel assembly 134.

The sound tubes 170a-170d capture the waterjets and allow them to remain intact without being broken up by the air. The intact waterjets are then controllably broken up by the deflecting panel assembly 134 and/or another portion of the waterjet directing assembly. As is well known in the art, the sound tubes 170a-170d also provide the added benefit of minimizing the sound waves coming off of the waterjet when idle.

Any suitable sound tube that is either currently available or later developed may be used, such as the sound tubes shown and described in U.S. Pat. No. 5,831,224, the entire disclosure of which is incorporated by reference herein. In one embodiment, each sound tube is about 9 inches (9") in length and is about three-quarters inches (¾") in diameter. Each sound tube is offset from the rear wall 60 of the portioner housing 48 a minimal amount such that the waterjet from the cutter is guided toward a corresponding orifice 90a-90c. In that regard, the bottom end of each sound tube is positioned about 3 inches (3") from the bottom of the tray 138 (or about 2" above the fourth deflecting panel 150d). The sound tube is preferably made from a hard, food-safe material. Moreover, the sounds tubes may instead be positioned near the front wall 64 of the portioner housing 48 in front of the edge of the belt 36 such that the waterjets are then controllably broken up by the sloped floor 70.

In that regard, the waterjet directing assembly is further defined by the sloped floor 70 of the portioner housing 48. In prior art processing machines, the floor was substantially V shaped in cross section (with the apex of the V extending along substantially the center longitudinal axis of the conveyor belt), which causes increased deflection of the waterjet and therefore increased generation of mist within the portioner housing 48. More specifically, the waterjet would strike a first downwardly sloping portion of the floor, deflect upwardly at least in part toward the second downwardly sloping floor portion, and then deflect upwardly at least in part toward the belt or door. The upwardly deflected water would create a large volume of mist and droplets within the portioner housing.

The inventors have found that a floor that slopes from the front wall to the rear wall in the range of about 5 degrees to about 25 degrees helps direct mist at the bottom of the portioner housing 48 toward the plenum 50. In the embodiment shown in FIG. 9, the floor 70 of the portioner housing 48 is sloped downwardly from the front wall 62 to the rear wall 60 at a substantially twenty degree angle relative to horizontal.

An additional aspect of the waterjet directing assembly includes locating the return portion of scanning/portioning belt 36 underneath the floor 70 of the portioner housing 48. As can be seen in FIG. 9, the return belt assembly 174 of belt 36 is disposed beneath the floor 70. In prior art assemblies, the return belt assembly is typically disposed within the portioner housing beneath the belt 36. In such a configuration, the return belt assembly deflects additional mist and waterjet that passes through the belt 36 and the workpiece. Accordingly, in the depicted configuration of FIG. 9, the return belt assembly 174 does not interfere with or otherwise deflect any mist or waterjet from the waterjet assembly, decreasing the overall generation of mist within the portioner assembly 48.

Referring to FIGS. 7 and 9, the visibility assembly of the mist management system 40 will now be described. The visibility assembly is generally defined by suitable lighting assembly disposed within the portioner housing 48 and the first and second windows 180a and 180b defined on the front part of the portioner housing 48 for allowing visibility into the machine. The lighting assembly includes any suitable lights that can withstand the moisture, sound waves, pressure fluctuations, high pressure spray, chemicals, etc., within the interior of the portioner housing 48, such as an LED strip, or the like. Moreover, the lights are effective to illuminate various parts of the belt, the waterjet cutters, the high pressure lines, etc., without reflecting off the mist. Accordingly, the lighting combined with the mist management system 40 allows increased visibility within the portioner housing 48.

In the depicted embodiment, the lighting assembly may include at least one light 210 secured to an interior portion of the portioner housing 48 that is configured to illuminate one or more high pressure valves, heads, connection lines, etc., such as high pressure valves 206. As can be seen in FIGS. 7 and 9, a plurality of high pressure valves 206 are positioned on the interior of the portioner housing 48 near an upper end of the windows 180a and 180b. The at least one light 210 is secured to the interior of the third hood portion 66 and is configured to shine light towards the high pressure valves 206. In this manner, the high pressure valves 160 are backlit by the at least one light 210 such that any leaks, dripping, etc., may be easily seen by a user through the windows 180a and 180b. The inventors have found that the backlighting effect of the at least one light 210 suitably illuminates the high pressure valves 160 through the mist. It should be appreciated that additional lights may be used to suitably backlight any other desired areas or components of the portioner station 28.

As noted above, the visibility assembly also includes the first and second windows 180a and 180b defined within the first and second housing doors 182a and 182b. Each window 180a and 180b is of a sufficient size such that a typically sized person standing in front of the window can see the valves 160, high pressure connection lines, and other structures inside the portioner housing 48 that often require maintenance. Moreover, the windows 180a and 180b are situated beneath each corresponding hood scoop 54a and 54b such that air flows into the hood scoops and down over the windows to remove any mist, condensation, etc. on the windows. The windows 180a and 180b are made from a suitable material to withstand the moisture and pressure fluctuations within the portioner housing 48, such as tempered glass.

Referring to FIG. 9, the flow path of air, mist, etc. through the processing machine 20 having a mist management system 40 formed in accordance with the present disclosure will now be described. With the plenum 50 in pneumatic communication with a suction source, such as a VFD exhaust fan, air is drawn into the portioner housing 48 through the first and second hood scoops 54a and 54b as well as through the optional first, second, third, and fourth air vents 112a, 112b, 112c, and 112d. The first and second hood scoops 54a and 54b direct incoming air downwardly toward the interior of the first and second windows 180a and 180b to help clear off any droplets, spray, and/or condensation on the interior of the windows, as indicated by the first flow path 212. The first flow path 212 shows that the air/mist may flow downwardly toward the sloped floor 70 after passing over the first and second windows 180a and 180b and thereafter toward the plenum 50.

The first and second hood scoops 54a and 54b also direct incoming air and mist downwardly toward the sound baffle assembly 130 and the deflecting panel assembly 134. The sound baffle assembly 130 and the deflecting panel assembly 134 help guide the air and mist toward the plenum 50. Mist is also guided downwardly toward the sloped floor 70 and thereafter toward the plenum 50 by the sound tubes 170a-170d when the waterjet cutters 44a-44d are idle.

Air, mist, water, condensate, etc., flow into the cavity 80 of the plenum 50 through the plurality of orifices defined in the rear wall 60 of the portioner housing 48. More specifically, air and mist flows through the first, second, third, and fourth orifices 90a, 90b, 90c, and 90d defined near the bottom edge of the rear wall 60, the first, second and third floor draining orifices 98a, 98b, and 98c defined near the bottom edge of the rear wall 60, and the first, second, third, and fourth waterjet carrier orifices 102a, 102b, 102c, and 102d. At the same time, the water and condensate from the waterjets strikes the fourth deflecting panel 150d of each deflecting panel assembly 134 to guide the mist, condensation, water, etc. into the plenum 50 through the first, second and third orifices 90a, 90b, and 90c.

The air/mist within the plenum cavity 80 flows out the suction opening 116 toward the exhaust opening 108. Moreover, any water, condensation, etc., drains out of the drain 104 at the bottom corner of the plenum 50.

Experiment

An experiment was conducted to observe the mist evacuation levels within a processing machine having a mist management system formed in accordance with an exemplary embodiment of the present disclosure.

The processing machine had a portioner station with four waterjet cutters, substantially similar to the portioner station 28 shown in the FIGURES. The exhaust fan used was the PLA30ST4P model fan available from Plastec Ventilation Inc., of Bradenton Florida. A static pressure of less than about 0.9 inches water gauge (inWG) was assumed. The air/mist density was not considered, but could be generally calculated as needed to select an appropriate exhaust fan for the machine configuration (such as, for instance, by using the density of saturated air at the given temperature and adding 10% for error, and/or using the density of ambient air with, for instance, about 50% relative humidity at the given temperature, and then adding about 50% of the flow of the water from the high pressure pumps to the weight of the volume of air being evacuated).

The mist evacuation was observed using different high pressure fluid levels, or the fluid pressure (in pounds per square inch (PSI)) to the waterjets (the "Pump PSI"), and using different measured airflow output capacities of the exhaust fan by varying its speed (RPM). The measured airflow output capacity is shown as approximate percentage of cubic feet per minute (% CFM), starting with a minimum CFM of 100%.

The test was conducted with four different mist management system configurations: (1) using no sound baffles or diverter panels; (2) using sound baffles only; (3) using diverter panels only; and (4) using sound baffles and diverter panels. The use of sound baffles and/or diverter panels was desired to help reduce the noise levels of the machine during use. The observations were recorded with each configuration and tabulated in TABLES A-D below. The mist evacuation observed was graded as follows:

1: All remains clear.
2: Some mist rises ½ way above belt, clears quickly.
3: Mist can reach the roof of the portioner housing momentarily but clears quickly.
4: Mist is constantly in the air, visibility to the back of the housing is passable, the high pressure connections/valves all remain clear.
5: Mist is heavy in the housing, difficult to see the back of the housing, the high pressure connections/valves remain clear enough to see.

It can be appreciated that the tabulated data shown below is for a specific portioner configuration in certain conditions (i.e., static pressure, air/mist density, waterjet pressure, etc.). Similar experimentation may be done to select a fan capacity for a different portioner configuration and/or different conditions. In that regard, the results tabulated below provide a baseline recommendation for fan selection and capacity. Based on the differences in portioner configuration and/or other conditions (such as the static pressure, air/mist density, waterjet pressure, etc.), an initial fan capacity may be selected and tested for mist evacuation. The criteria for each grade, as outlined above, may be used to identify the optimal fan capacity for one or more configurations.

| PUMP PSI | 100% CFM | 135% CFM | 170% CFM | 220% CFM |
|---|---|---|---|---|
| 45000 PSI |  | 2 | 1 |  |
| 55000 PSI |  | 2 | 1 |  |
| 65000 PSI |  | 3 | 2 |  |
| 75000 PSI |  |  | 3 | 1 |
| 85000 PSI |  |  | 3 | 2-3 |

| PUMP PSI | 100% CFM | 135% CFM | 170% CFM | 220% CFM |
|---|---|---|---|---|
| 45000 PSI |  | 2 | 2 |  |
| 55000 PSI |  | 3 | 2 |  |
| 65000 PSI |  | 3 | 3 | 2 |
| 75000 PSI |  | 3 | 2-3 | 2 |
| 85000 PSI |  |  | 3 | 3 |

| PUMP PSI | 100% CFM | 135% CFM | 170% CFM | 220% CFM |
|---|---|---|---|---|
| 45000 PSI | 1 | 1 |  |  |
| 55000 PSI |  | 2 |  |  |
| 65000 PSI |  | 2 | 1-2 |  |

-continued

| PUMP PSI | 100% CFM | 135% CFM | 170% CFM | 220% CFM |
|---|---|---|---|---|
| 75000 PSI | | 4 | 3 | |
| 85000 PSI | | 4-5 | 4 | 3 |

| PUMP PSI | 100% CFM | 135% CFM | 170% CFM | 220% CFM |
|---|---|---|---|---|
| 45000 PSI | 2 | 1 | | |
| 55000 PSI | 2 | 1 | | |
| 65000 PSI | | 3 | 2 | |
| 75000 PSI | | 4 | 3 | |
| 85000 PSI | | 5 | 4 | 3 |

As can be appreciated from the Tables shown above, the chosen exhaust fan (the PLA30ST4P model fan available from Plastec Ventilation Inc., of Bradenton Florida) was suitable for evacuating mist in the above-noted portioner station configurations (i.e., using four waterjet cutters, sounds baffles and/or diverter panels) at various different water pressure levels using an appropriate fan speed to create the measured CFM output.

Regarding some specific observations, in the configurations using lower pump pressures (e.g., 45000-65000 PSI), the use of diverter panels minimally affects the mist evacuation. However, all the configurations yielded acceptable levels of visibility and mist evacuation (e.g., the windows remained substantially clear, the visibility to high pressure fluid connections and waterjets remained good, etc.) At higher pump pressures (e.g., 75000-85000 PSI), the diverter panels actually appeared to limit the clearing of mist in the cut house, which could be overcome with higher fan speeds if possible. The use of sound baffles help reduced the noise levels (not tabulated for simplicity) while not substantially adversely affecting the mist evacuation at both lower and higher fan speeds.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of managing mist generated within a processing machine by operation of a liquid jet cutter, the method comprising:
conveying a workpiece on a conveyor along a conveying direction of a portioning station of the processing machine, the portioning station comprising an enclosed portioner housing having:
a front wall extending along the portioning station,
a rear wall opposite the front wall,
at least one hood portion extending above the conveyor between the front wall and the rear wall,
a floor defined opposite the at least one hood portion,
a first end wall extending between the front wall and the rear wall, and
a second end wall extending between the front wall and the rear wall opposite the first end wall;
activating at least one liquid jet cutter to generate the water jet within the portioner housing;
portioning the workpiece using the at least one liquid jet cutter;
creating a low pressure chamber beneath the conveyor in pneumatic communication with the enclosed portioning station through at least one orifice of the rear wall of the enclosed portioner housing; and
directing air through at least one opening in the at least one hood portion of the enclosed portioner housing, through the conveyor, and through the at least one orifice of the rear wall into the low pressure chamber.

2. The method of claim 1, wherein creating the low pressure chamber in pneumatic communication with the portioning station through the at least one orifice of the rear wall of the enclosed portioner housing comprises creating an even pressure drop along a length of the low pressure chamber.

3. The method of claim 1, further comprising directing air toward at least one window of the enclosed portioner housing.

4. The method of claim 1, further comprising redirecting liquid from the at least one liquid jet cutter toward the low pressure chamber.

5. The method of claim 4, wherein redirecting liquid from the at least one liquid jet cutter toward the low pressure chamber comprises redirecting the liquid off a first angled surface disposed beneath the at least one liquid jet cutter.

6. The method of claim 5, wherein redirecting liquid from the at least one liquid jet cutter toward the low pressure chamber further comprises redirecting the waterjet off a second angled surface disposed beneath the first angled surface.

* * * * *